United States Patent [19]

Plant et al.

[11] 4,092,478
[45] May 30, 1978

[54] TRIPHENDIOXAZINE TRIAZINYL DYES HAVING PHOSPHONIC ACID GROUPS

[75] Inventors: David William Plant; David John Williams, both of Manchester, England

[73] Assignee: Imperial Chemical Industries Limited, United Kingdom

[21] Appl. No.: 752,918

[22] Filed: Dec. 21, 1976

[30] Foreign Application Priority Data

Jan. 8, 1976 United Kingdom .................. 672/76
Jan. 20, 1976 United Kingdom ................ 2171/76
Mar. 24, 1976 United Kingdom .............. 15397/75

[51] Int. Cl.² .......................................... C07D 491/22
[52] U.S. Cl. ........................................ 544/76; 8/1 B; 8/54.2
[58] Field of Search ........................... 260/246; 544/76

[56] References Cited

U.S. PATENT DOCUMENTS

| 2,845,420 | 7/1958 | Freyermuth et al. ................ 260/246 |
| 2,954,378 | 9/1960 | Pugin et al. ............................ 544/76 |
| 3,202,550 | 8/1965 | Grossmann et al. ................. 148/6.1 |
| 3,883,523 | 5/1975 | Parton .................................... 544/76 |
| 3,996,221 | 12/1976 | Leng et al. ........................... 260/246 |

FOREIGN PATENT DOCUMENTS 2,124,080 11/1971 Germany.
2,302,382 7/1973 Germany.

Primary Examiner—John M. Ford

Attorney, Agent, or Firm—Cushman, Darby & Cushman

[57] ABSTRACT

A dyestuff of the formula:

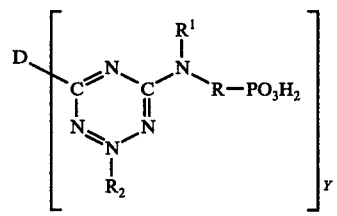

wherein
D is the residue of a colored compound of the 6,13-dichlorotriphendioxazine series, the triazine group being attached to a nitrogen atom in D, and wherein:
Y is 1 or 2,
$R_2$ is Cl, Br, OH, lower alkoxy, $NH_2$, a quaternary ammonium group or the residue of a primary or secondary amine,
$R_1$ is H or an alkyl or substituted alkyl group of up to 4 carbon atoms, and
R is a hydrocarbon or substituted hydrocarbon radical.

The invention provides a range of blue dyestuffs especially useful for reactively dyeing cellulose by heating in the presence of a carbodiimide.

8 Claims, No Drawings

TRIPHENDIOXAZINE TRIAZINYL DYES HAVING PHOSPHONIC ACID GROUPS

This invention relates to new dyestuffs and more particularly to new dyestuffs of the 6,13-dichlorophendioxazine series suitable for the colouration of cellulose textile materials.

According to the invention there are provided dyestuffs of the formula:

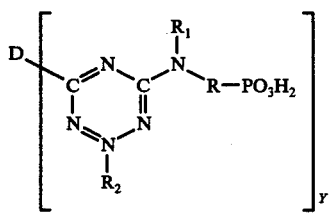

wherein
D is the residue of a coloured compound of the 6,13-dichlorotriphendioxazine series, the triazine group being attached to a nitrogen atom in D, and wherein:

Y is 1 or 2,
$R_2$ is Cl, Br, OH, lower alkoxy, $NH_2$, a quaternary ammonium group or the residue of a primary or secondary amine,
$R_1$ is H or an alkyl or substituted alkyl group of up to 4 carbon atoms, and
R is a hydrocarbon or substituted hydrocarbon radical.

As examples of hydrocarbon or substituted hydrocarbon radicals represented by R, there may be mentioned saturated aliphatic radicals, e.g. alkylene radicals of 1 to 6 carbon atoms, which may be substituted, e.g. by OH, phenyl and benzyl, cycloaliphatic or aromatic radicals, e.g. cyclohexylene, phenylene which may be substituted, e.g. by F, Cl, Br, alkyl, alkoxy, $SO_3H$, $CO_2H$, $CF_3$, $NO_2$; naphthylene, which may be substituted, e.g. by $SO_3H$ or $PO_3H_2$; and araliphatic e.g. $-C_6H_4 \cdot CH_2-$.

As examples of alkyl or substituted alkyl radicals represented by $R_1$ there may be mentioned $C_1$-$C_4$ alkyl, e.g. n-butyl, n-propyl, ethyl or methyl, also hydroxyalkyl, e.g. β-hydroxyethyl, β-hydroxypropyl, β-sulphatoethyl, $-CH_2CH_2-PO_3H_2$, β-cyanoethyl, alkoxyalkyl, e.g. γ-methoxypropyl, β-ethoxyethyl and β-methoxyethyl.

As examples of amine radicals represented by $R_2$ there may be mentioned: methylamino, ethylamino, n-propylamino, dimethylamino, diethylamino, β-hydroxyethylamino, di-(β-hydroxyethyl)aminamino, piperidino, morpholino, β-methoxyethylamino, carboxymethylamino, β-sulphoethylamino, N-methyl-β-sulphoethylamino, β-phosphonoethylamino, o-, m- or p-sulphoanilino, N-methyl-o, m- or p-sulphoanilino, 2,4-, 2,5- or 3,5-disulphoanilino, o-, m- or p-carboxyanilino, 4- or 5-sulpho-2-carboxyanilino, 4- or 5-sulpho-2-methylanilino, 4- or 5-sulpho-2-methoxyanilino, 4- or 5-sulpho-2-chloroanilino, 2-, 5- or 8-sulpho-1 naphthylamino, 1-, 4- or 5-sulpho-2-naphthylamino, 1,5-, 4,8-, 5,7- or 6,8-disulpho-2-naphthylamino and 3,8- or 4,8-disulpho-1-naphthylamino.

As examples of the coloured compounds from which is derived the residue D there may be mentioned any coloured compound derived from 6,13-dichlorotriphendioxazine.

Examples of such 6, 13-dichlorotriphendioxazines may be found in U.K Specifications Nos. 1,349,513, 1,368,158 and 1,450,746 which describe generally reactive dyes of various 6, 13-dichlorotriphendioxazine series.

A preferred general class of dyestuffs of the present invention may be represented by the formula:

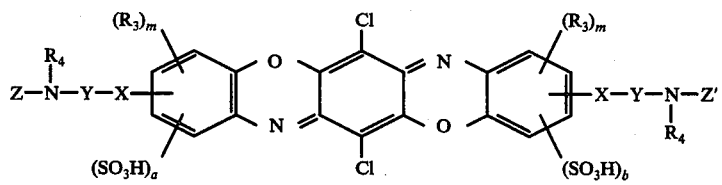

wherein
$(R_3)_m$ represents m substituent groups $R_3$ where each $R_3$ is independently halogen, $C_{1-4}$ alkyl, $C_{1-4}$ alkoxy or COOH,
m is 0 to 3
$a+b$ is 1 to 4
$R_4$ is H, or an alkyl or substituted alkyl of 1-4 carbon atoms.
X is a direct link or a linking atom or group,
Y is an optionally substituted linking group of the aromatic, araliphatic, or aliphatic series, or X and Y together are a direct link and Z and Z' are each independently H or

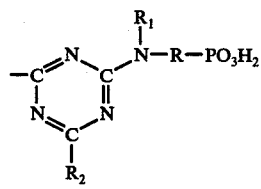

where
R, $R_1$, and $R_2$ have the meanings hereinbefore defined and at least one of Z and $Z^1$ are not H.

A particularly preferred general class of dyestuffs are compounds of formula (5) in which $m = 0$, $a = b = 1$, and each X is joined to the position para to the heterocyclic nitrogen i.e. dyestuffs of the formula:

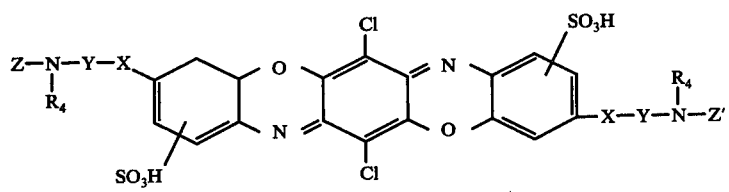

wherein

X, Y, R$_4$, Z and Z' have the meanings given above.

As examples of atoms or groups represented by X, there may be mentioned O, S, CH$_2$, CO, CH=CH, NHCONH, NHCH$_2$CH$_2$NH, OCH$_2$CH$_2$O, N=N

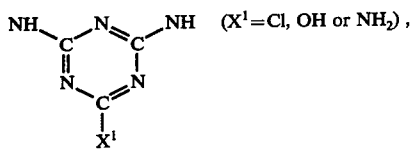 (X$^1$=Cl, OH or NH$_2$), 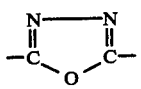

and, preferably, NH.

Preferred types within the general classes defined by formulae (2) and (3) are (a) those in which X and Y together are a direct link (b) those in which Y is a benzene or naphthalene linking group optionally substituted particularly by 1,2 or 3 SO$_3$H groups, and especially when such groups are combined with an X representing NH and (c) those in which Y is aliphatic or araliphatic linking group either of which may be optionally substituted. As examples of such groups there may be mentioned ethylene, 1,2- and 1,3-propylene, 2-hydroxy-1,3-propylene, 1- and 2- phenyl- 1,3-propylene, 2-(4'-sulphophenyl)-1,3-propylene, 1,4-, 2,3- and 2,4-butylene, 2-methyl-1,3-propylene, 2-methyl-2,4-pentylene, 2,2-dimethyl-1,3-propylene, 1-phenylethylene, 1-chloro-2,3-propylene, 1,6- and 2,5-hexylene, 2,3-diphenyl-1,4-butylene, 1-(methoxycarbonyl)-1,5-pentylene, 1-carboxy-1,5-pentylene, 2,7-heptylene, 3-methyl-1,6-hexylene, —CH$_2$CH$_2$OCH$_2$CH$_2$—, —CH$_2$CH$_2$SCH$_2$CH$_2$—, —CH$_2$CH$_2$SSCH$_2$CH$_2$—,

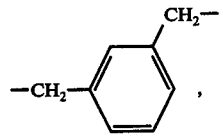 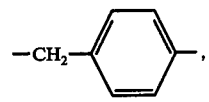

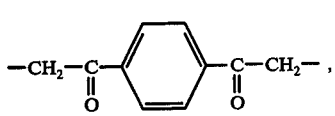 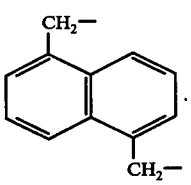

In this type also it is usually preferred that X is NH.

In those type (C) cases where X is a substituted amino the group linked to the nitrogen of X may, in addition to the group Y, be linked to both nitrogen atoms in the structure —X—Y—NR$_4$—. As examples of such a group there may be mentioned

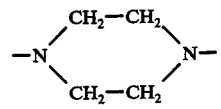

An especially preferred class of dyes of the present invention are those of formula (3) wherein X is NH, Y is selected from the group consisting of phenylene substituted by 0-2 SO$_3$H, —CH$_2$CH$_2$—, —CH$_2$—CH(OH)—CH$_2$—, —CH$_2$—CH(OSO$_3$H)CH$_2$—,

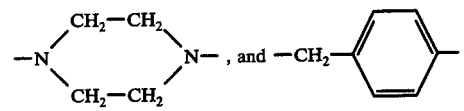

or X and Y together are a direct link;

R$_4$ is selected from the group consisting of H, C$_{1-4}$ alkyl and C$_{1-4}$ alkyl substituted by one of OH, SO$_3$H, or COOH;

Z and Z' are each selected from the group consisting of H and

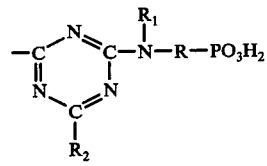

wherein R$_2$ is OH, Cl, Br, NH$_2$, C$_{1-4}$ alkylamino, di(C$_{1-4}$alkyl)amino, and radicals of the aforementioned two types of which the alkyl group is substituted by one of OH, SO$_3$H, OSO$_3$H or COOH, N-morpholino, benzylamino, sulphobenzylamino, phenoxy, sulphophenoxy, mono-, or di- or tri-sulphonaphthylamino, dicarboxy anilino or a radical of the formula:

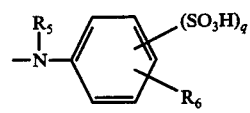

wherein $q$ = 0, 1 or 2; R$_5$ is H, methyl, sulphomethyl, ethyl or hydroxyethyl; and R$_6$ is H, CH$_3$, COOH, Cl, NH$_2$ or

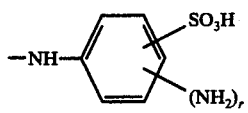

where r = 0 or 1 or $R_2$ is a quaternary ammonium group selected from the group consisting of $N^+(CH_3)_3 hal^-$, $N^+(CH_3)_2 C_2H_5 hal^-$ and

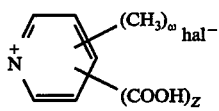

where hal is Cl or Br, W = 0 or 1 and Z = 0 or 1;

$R_1$ is an atom or group of the type defined for $R_4$ and, R is selected from the group consisting of $C_{1-6}$ alkylene, $C_{1-6}$ hydroxyalkylene, phenylene having 0-3 substituents each selected from the group consisting of $SO_3H$, $C_{1-4}$ alkyl, $C_{1-4}$ alkoxy and chloro; naphthylene, sulphonaphthylene, benzylidene, sulphobenzylidene and a group of the formula:

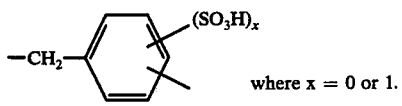

providing that at least one of Z and $Z^1$ is not H.

It is especially preferred in the above dyes to have $R_1$ and $R_4$ each selected from ethyl, hydroxyethyl, methyl and more especially H.

The new dyestuffs in which $R_2$ is Cl, Br, lower alkoxy, $NH_2$ or the residue of a primary or secondary amine can be obtained by reacting a compound of the formula:

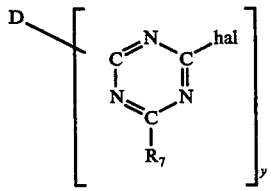

wherein D and y have the meanings stated above, hal is Cl or Br and $R_7$ is Cl, Br, lower alkoxy, $NH_2$ or the residue of a primary or secondary amine with up to y moles of an amine of the formula:

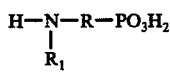

wherein R and $R_1$ have the meanings stated above.

The above process can conveniently be carried out by stirring the reactants together in a suitable liquid reaction medium which may be inorganic, e.g. water, or organic, e.g. ethanol, but there is preferably used a mixture of water with a water-miscible organic liquid as reaction medium, since it is thereby usually possible to obtain a medium in which the reaction proceeds quickly and yet in which the product is insoluble and may be isolated by filtration, washing and drying. It is usually advantageous to add an acid-binding agent, e.g. sodium bicarbonate or sodium acetate to the reaction medium to maintain the pH at from 5.5 to 8 during the reaction. The reaction may be carried out at a temperature of from 10° C upwards. As examples of amines of formula (5) which may be used, there may be mentioned:

1-aminomethylphosphonic acid
2-aminoethylphosphonic acid
3-aminopropylphosphonic acid
4-aminobutylphosphonic acid
5-aminopentylphosphonic acid
6-aminohexylphosphonic acid
1-amino-1-methylethylphosphonic acid
2-amino-1-methylethylphosphonic acid
1-amino-3-methylbutylphosphonic acid
2-amino-1-hydroxypropylphosphonic acid
3-amino-2-hydroxypropylphosphonic acid
2-methylaminoethylphosphonic acid
α-aminobenzylphosphonic acid
α-aminophenylethylphosphonic acid
α-amino-2,6-dimethoxybenzylphosphonic acid
3- or 4-aminobenzylphosphonic acid
1-benzylaminocyclohexylphosphonic acid
2-, 3- or 4-aminophenylphosphonic acid
3-amino-4-methylphenylphosphonic acid
4-amino-2-fluorophenylphosphonic acid
2-amino-5-chlorophenylphosphonic acid
3-amino-4-chlorophenylphosphonic acid
4-amino-2-bromophenylphosphonic acid
3-amino-4-methoxyphenylphosphonic acid
4-amino-3-nitrophenylphosphonic acid
4-n-butylamino-3-nitrophenylphosphonic acid
1-naphthylamine-6-phosphonic acid
2-naphthylamine-6-phosphonic acid
1-naphthylamine-7-phosphonic acid
7-phosphono-2-naphthylamine-5-sulphonic acid
3-amino-4-sulphophenyl phosphonic acid
2-sulpho-4-methyl-5-aminophenyl phosphonic acid
2-sulpho-4-ethyl-5-aminophenyl phosphonic acid
2-sulpho-4-methoxy-5-aminophenyl phosphonic acid
2-sulpho-4-ethoxy-5-aminophenyl phosphonic acid
2-methyl-4-sulpho-5-aminophenyl phosphonic acid
2-ethyl-4-sulpho-5-aminophenyl phosphonic acid
2-methoxy-4-sulpho-5-aminophenyl phosphonic acid
2-ethoxy-4-sulpho-5-aminophenyl phospnonic acid
2-chloro-4-sulpho-5-aminophenyl phosphonic acid
2,5-dimethyl-3-amino-4-sulphophenyl phosphonic acid
2-chloro-3-amino-4-sulpho-5-methylphenyl phosphonic acid.

The compounds of formula (4) can themselves be obtained by reacting a triphendioxazine dyestuff containing an acylatable amino group or groups with a s-triazine compound of the formula:

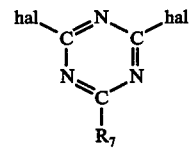

wherein 'hal' and $R_7$ have the meanings stated above or in the case that $R_7$ is $NH_2$ or the residue of a primary or secondary amine, by reacting a triphenodioxazine dyestuff with an acylatable amino group with cyanuric chloride or bromide and reacting the resultant product with ammonia or the appropriate amine.

The triphendioxazine dyestuffs containing an acylatable amino group or groups used to obtain the compounds of formula (4), may be obtained by conventional means which, in general, involve condensing 1 mole of 2,3,5,6 - tetrachloro-1,4-benzoquinone with 2 moles of a diamine and heating the resulting dianilide in the presence of a strongly acid condensing agent e.g. oleum to effect ring closure. Thus, for example, the dyestuffs of the preferred general class represented by formula (2) will be manufactured from an amino-6,13-dichlorotriphendioxazine of formula (2) wherein both Z and Z' represent H which in turn is obtained by condensing 2,3,5,6-tetrachloro-1,4-benzoquinone with 2 moles of the diamine

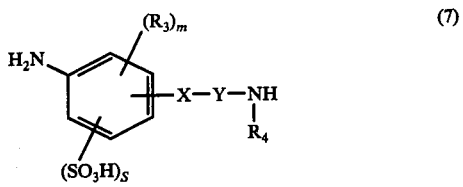

wherein X, Y, $R_3$, $R_4$ and $m$ have the meanings hereinbefore defined and $s$ is 0, 1 or 2, and condensing the resulting dianilide in the presence of a strongly acid condensing agent e.g. oleum to effect ring closure. Further $SO_3H$ groups may be introduced during this ring closing step.

Examples of diamines of formula (7) which may be used to prepare amino-6,13-dichlorotriphendioxazines and thence dyestuffs of formula (2) in which X and Y together are a direct link i.e. preferred dyestuffs of type (a) given above are given in UK Specification No. 1349513.

Similarly examples of diamines of formula (7) in which Y is an optionally substituted benzene or naphthalene group may be found in UK Specification No. 1368158 and examples of diamines of formula (7) in Y is an aliphatic and araliphatic group may be found in UK Specification No. 1450746. These diamines yield intermediate amino-6,13-dichlorotriphendioxazines which can be used to manufacture respectively preferred dyestuffs of types (b) and (c) given above.

The new dyestuffs in which $R_2$ of formula (1) represents OH can be obtained by treating an aqueous solution of the corresponding dyestuff in which $R_2$ is, Cl or Br with an alkali, e.g. sodium or potassium hydroxide, at an elevated temperature e.g. above 50° C or by treating the corresponding dyestuff in which $R_2$ is a quaternary ammonium group at room temperature or above with an alkali e.g. sodium or potassium hydroxide at 20°-80° C. The quaternary ammonium compound may be formed in situ in the medium in which a dyestuff in which $R_2$ is Cl or Br is converted to OH by the presence of a catalytic amount of a tertiary amine such as trimethylamine or 1,4-diazabicyclo[2,2,2]octane, thereby enabling the treatment to be conducted at lower temperatures e.g. room temperature.

The new dyestuffs in which $R_2$ of formula (1) represent $NH_2$, a quaternary ammonium group or the residue of a primary or secondary amine can be obtained by reacting the corresponding dyestuff in which $R_2$ is Cl or Br with ammonia, a tertiary amine or a primary or secondary amine. The reaction can conveniently be carried out by contacting the dyestuff with the ammonia or the amine in aqueous solution for a period of time. Reaction with a tertiary amine can be effected at a temperature of 10° C upwards, reaction with ammonia or the primary or secondary amines can be carried out at a temperature from 50° to 100° C or higher, if desired; an excess of the ammonia or amine can be used as binding agent or an inorganic acid-binding agent e.g. sodium carbonate can be added to neutralise the hydrogen chloride liberated.

As examples of amines which can be used, there may be mentioned:

mono- and di-alkylamines, preferably of 1 to 4 carbon atoms in the alkyl radicals, the hydroxy- or alkoxy- or other derivatives of these, e.g. containing CN, acyloxy, sulphato or phosphono substituents, saturated N-heterocyclics, sulphonated anilines or naphthylamines and derivatives of the former containing $CH_3$, Cl, $CO_2H$ or $OCH_3$ on the benzene nucleus, also $CH_3$ or $CH_2SO_3H$ on the nitrogen atom, aniline carboxylic acids. As particular examples of all these, there may be mentioned: methylamine, ethylamine, n-propylamine, dimethylamine and diethylamine, β-hydroxyethylamine, di(β-hydroxyethyl)amine, piperidine, morpholine, β-methoxyethylamine, aminoacetic acid, aniline-2,5-, 2,4- and 3,5-disulphonic acids, aniline o-, m- and p-sulphonic acid, N-methylaniline o-, m- and p-sulphonic acid, o-, m- and p-aminobenzoic acid, 4-and 5-sulpho-2-aminobenzoic acid, 2-aminotoluene-5-sulphonic acid, 2-amino-5-sulacid, 2-aminotoluene-5-sulphonic acid, 2-amino-5-sulphochlorobenzene, 2-amino-4-sulphoanisidine, N-sulphomethylaniline, 5-amino-2-methoxy-benzoic acid, β-aminoethane sulphonic acid, N-methylaminoethane sulphonic acid, β-aminoethylphosphonic acid and mono-, di, and tri-sulphonic acids of 1-amino and 2-aminonaphthalene.

The new dyestuffs in which $R_2$ represents Cl, Br optionally substituted amino or lower alkoxy can alternatively be obtained by reacting a triphendioxazine dyestuff containing one or two acylatable amino groups with a s-triazine compound of the formula:

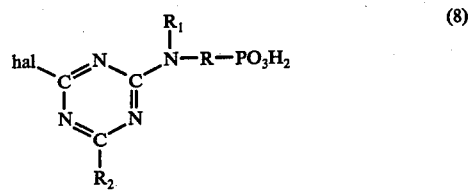

wherein the symbols R, $R_1$ and 'hal' have the meanings stated above in connection with formulae (1) and (4), and $R_2$ has the meaning just stated.

This process can be carried out by stirring the reactants together in a suitable liquid reaction medium which may be inorganic e.g. water, or organic, e.g. ethanol, but there is preferably used a mixture of water with a water-miscible organic liquid as reaction medium, since it is thereby usually possible to obtain a medium in which the reaction proceeds quickly and yet in which the product is insoluble and may be isolated by filtration, washing and drying. It is usually advantageous to add an acid-binding agent e.g. sodium bicarbonate or sodium acetate to the reaction medium to maintain the pH at from 5.5 to 8 during the reaction. The reaction may be carried out at a temperature from 20° C to the boil depending on the atoms or groups represented by 'hal' and $R_2$ in formula (8).

As examples of triphendioxazine dyestuffs which may be used in the process, there may be mentioned the triphendioxazine containing acylatable amino groups described earlier in connection with obtaining compounds of formula (4).

The s-triazine compounds of formula (8) can themselves be obtained by reacting together a s-triazine compound of the formula:

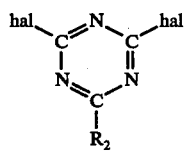

and an amine of the formula (5) above, or where $R_2$ represents an optionally substituted amino group, by reacting cyanuric chloride or bromide with 1 mole of the amine of formula (5) and reacting the product with 1 mole of ammonia or a primary or secondary amine.

The new dyes can be isolated as solid products from the reaction mixtures in which they have been prepared by conventional means such as spray-drying or by precipitation and filtration. They are preferably isolated in the acid form and/or in the form of an ammonium salt, or partly in one of these forms and partly as an alkali metal, e.g. Li, Na or K, salt. These salts can be obtained by adding a halide, e.g. the chloride, of the desired alkali, metal or an ammonium halide or ammonia to the completed reaction mixture before isolation. Alternatively, by addition of an alkanolamine, e.g. diethanolamine, to the completed reaction mixture, a highly soluble form of the dyestuff is obtained which can be used directly, as a total liquor, for preparation of dye liquors or printing pastes. In some instances the dyestuff is sufficiently soluble to give useful total liquors without the use of an alkanolamine.

The new dyestuffs are soluble in water owing to the presence of phosphonic acid groups. In many cases, there may also be sulphonic acid groups present to increase their solubility. They can be used, in general, for the colouration of textile materials which can be dyed by dyes solubilised by anionic groups, e.g. natural and synthetic polyamide materials e.g. wool, silk, polyhexamethylene adipamide and polycaproimide, but more especially natural or regenerated cellulose textile materials, e.g. cotton, linen and viscose rayon; in the case of cellulose textile materials, they are preferably fixed on the fibre by baking at a temperature of from 95° to 205° C in the presence of a carbodiimide e.g. cyanamide, dicyandiamide.

The new dyestuffs are particularly suitable for application to mixed fabrics of cellulose and synthetics, e.g. polyester materials, together with disperse dyes from a single dyebath or printing paste. In this respect, the new dyestuffs show an advantage over most conventional reactive dyes which are normally applied in the presence of alkaline fixing agents. The latter lead to flocculation of the majority of disperse dyes, so that the range of the latter which can be applied together with conventional reactive dyes in single dyebaths or printing pastes is very limited. In contrast, the acid fixing conditions used for the new dyes have no effect on disperse dyes and the two classes of dyes can be used together without difficulty.

The new dyestuffs have the advantage that they offer a ready means of introducing a phosphonic acid group into triphendioxazine dyestuffs which are already commercially available and without the need to develop new chromophores containing the phosphonic acid group.

The invention is illustrated by the following Examples in which parts are by weight.

EXAMPLE 1

17.88 Parts of a 31% paste of an aminotriphendioxazine dyebase a major component of which has the structure:

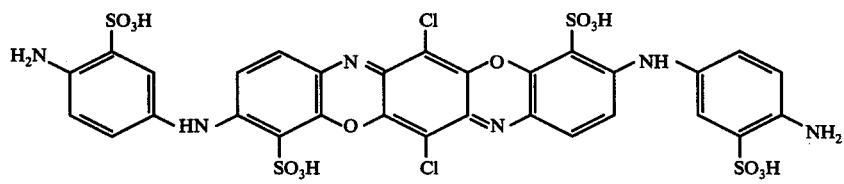

(other major components being penta- and hexa-sulpho analogues)

are dissolved in 50 parts of water and the pH adjusted to 7 with 15 parts of 2N aqueous sodium hydroxide. The triphendioxazine solution is added over 30 min. at 0°–5° to a suspension of 2.02 parts of cyanuric chloride in 25 parts of acetone and 80 parts of water, keeping the pH at 7 with addition of 6 parts of 2N aqueous sodium hydroxide. The mixture is sitred at 0°–5° at pH 7 for 2 hours, filtered to removed traces of unchanged cyanuric chloride and the filtrate used in the following stage.

2.12 parts of 3-aminophenylphosphonic acid in 50 parts of water is adjusted to pH 7 with 2N aqueous sodium hydroxide, and the solution added at 20° to the foregoing triphendioxazine solution. The mixture is heated to 45° and maintained at 45° for 1 hour, keeping the pH at 7 throughout. The mixture is cooled, salted to 30% w/v with sodium chloride and stirred for 18 hours at 20°–5°. The product is filtered off, slurried in excess ethanol, and water is added until the dyestuff just begins to dissolve. The suspension is filtered off and the desalted product dried at 50°.

When applied to cotton by baking at 200° C in the presence of cyanamide or dicyandiamide, a bright midblue dyeing with very good fastness to light and washing is obtained.

The dyebase (10) is prepared as described in Example 1 of UK Pat. No. 1,368,158.

EXAMPLE 2

Example 1 is repeated except that the dyestuff is isolated by adding the reaction mixture to 800 parts of acetone, stirring 30 min. at 20°, filtering, washing the purified dye with 200 parts of acetone and drying at 45°–50°.

The dye of identical structure to that described in Example 1, yielded a similar bright-blue dying when applied to cellulose at 200° in the presence of cyanamide or dicyandiamide.

EXAMPLE 3

Example 1 is repeated except that sodium carbonate is used in place of sodium hydroxide as acid-binding agent, and that the final reaction is evaporated to dryness under reduced pressure at 45°–50°. The residual solid product gives a bright blue dyeing similar to that obtained in Example 1.

EXAMPLE 4

Example 2 is repeated except that concentrated aqueous ammonia of density 0.880 is used in place of sodium hydroxide as acid-binding agent. The product dyes cellulose a bright mid blue shade when applied to 200°–205° in the presence of cyanamide or dicyandiamide.

EXAMPLE 5

Example 3 is repeated except that solid dyestuff is not isolated but the dyestuff liquor is retained as a concentrated aqueous solution. In this form, it dyed cellulose bright mid-blue shades when applied at 200°–205° in the presence of cyanamide or dicyandiamide.

EXAMPLE 6

28.46 parts of a 39% paste of an amino triphendioxazine dyebase of structure (10) are dissolved in 50 parts of water and the pH adjusted to 6.4 with 2.1 parts of concentrated aqueous ammonia of density 0.880. The mixture is stirred for 30 minutes at 20°, and added at 0°–5° over 15 min. to a suspension of 4.06 parts of cyanuric chloride in 15 parts of water containing 0.1 parts of Calsolene Oil, maintaning the pH at 5–5.5 with aqueous ammonia. The mixture is stirred at 0°–5° at pH 5–5.5 for 3 hours, screened to remove unchanged cyanuric chloride and the filtrate reacted as follows with 3-aminophenylphosphonic acid.

4.02 parts of 3-aminophenylphosphonic acid in 10 parts of water, adjusted pH 5 with aqueous ammonia are added at room temperature to the foregoing triphendioxazine solution over 10 min, maintaining the pH at 5 with aqueous ammonia. The mixture is raised to 35°–40° over 5 min. and maintained at 35° for 30 min at pH 5. The mixture is screened, and used directly to provide a concentrated aqueous solution of the ammonium salt of the dyestuff described in Example 1.

When applied to cellulose at 200°–205° in the presence of cyanamide or dicyandiamide, bright mid-blue dyeings with very good light and wash-fastness are obtained.

EXAMPLE 7

A dyestuff of similar shade to that of Example 1 is obtained when the procedure of Example 1 is followed using an equivalent amount of 3-amino-4-sulphophenylphosphonic acid is used in place of the 3-aminophenylphosphonic acid.

Dyestuffs of similar shade are also obtained if the 3-aminophenylphsophonic acid of Example 1 is replaced by equivalent amounts of the following:

| Example | Amine |
|---|---|
| 8 | 1-aminomethylphosphonic acid |
| 9 | 2-aminoethylphosphonic acid |
| 10 | 3-aminopropylphosphonic acid |
| 11 | 4-aminobutylphosphonic acid |
| 12 | 3-amino-2-hydroxypropylphosphonic acid |
| 13 | 2-methylaminoethylphosphonic acid |
| 14 | α-aminobenzylphosphonic acid |
| 15 | 3-aminobenzylphosphonic acid |
| 16 | 4-aminobenzylphosphonic acid |
| 17 | 3-amino-4-methylphenylphosphonic acid |
| 18 | 3-amino-4-methoxyphenylphosphonic acid |
| 19 | 3-amino-4-chlorophenylphosphonic acid |
| 20 | 1-naphthylamine-6-phosphonic acid |
| 21 | 1-naphthylamine-7-phosphonic acid |
| 22 | 7-phosphono-2-naphthylamine-5-sulphonic acid |
| 23 | 2-sulpho-4-methoxy-5-aminophenyl phosphonic acid |
| 24 | 2-sulpho-4-methoxy-5-aminophenyl phosphonic acid |
| 25 | 6-aminohexylphosphonic acid |
| 26 | 2-sulpho-5-aminobenzylphosphonic acid |
| 27 | N-methyl-3-amino phenyl phosphonic acid |

EXAMPLE 28

A solution of 6 parts of 3-aminophenylphosphonic acid in 100 parts of water is adjusted to pH 7.0 with sodium hydroxide solution, and added over 1 hour at 0°–5° to a suspension of 6.1 parts of cyanuric chloride in 40 parts of acetone and 100 parts of water, maintaining the pH at 6.5–7.0 with N-sodium hydroxide. The solution is diluted with 500 parts of water and filtered to remove unchanged cyanuric chloride. The filtrate is added at room temperature to a suspension of 7.7 parts of a triphendioxazine a major component of which has the structure

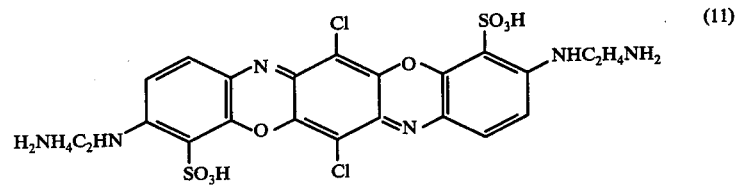

(11)

in 250 parts of water. The pH is adjusted to 8.5–9.0, and the mixture stirred 18 hours at 20° and 7 hours at 50°. The mixture is cooled and poured into 3000 parts of acetone. The product is filtered off and dried at 50°.

When applied to cellulose by baking at 200° in the presence of cyanamide or dicyandiamide, a bright blue, redder in shade than the dye of Example 1, is obtained.

The dyebase (11) is prepared as in Example 1 of UK Pat. No. 1,450,746.

Dyestuffs of similar shade are obtained if the 3-aminophenylphosphonic acid in the above procedure is replaced by equivalent amounts of the following:

| Example | Amine |
|---|---|
| 29 | 2-aminophenylphosphonic acid |
| 30 | 4-aminophenylphosphonic acid |
| 31 | 3-aminopropylphosphonic acid |
| 32 | 2-aminoethylphosphonic acid |
| 33 | 3-amino-4-methoxyphenylphosphonic acid |
| 34 | 3-amino-4-sulphophenylphosphonic acid |
| 35 | 2-sulpho-4-methyl-5-aminophenylphosphonic acid |
| 36 | 2-sulpho-4-ethyl-5-aminophenylphosphonic acid |
| 37 | 2-sulpho-4-methoxy-5-aminophenylphosphonic acid |
| 38 | 2-methyl-4-sulpho-5-aminophenylphosphonic acid |
| 39 | 2-ethyl-4-sulpho-5-aminophenylphosphonic acid |
| 40 | 2-methoxy-4-sulpho-5-aminiophenylphosphonic acid |
| 41 | 7-phosphono-2-naphthylamine-5-sulphonic acid |
| 42 | 2-naphthylamine-6-phosphonic acid |

| Example | Amine |
|---|---|
| 43 | 1-naphthylamine-6-phosphonic acid |
| 44 | 1-naphthylamine-7-phosphonic acid |

EXAMPLE 45

By following the procedure of Example 28 using an equivalent amount of a triphendioxazine a major component of which has the structure:

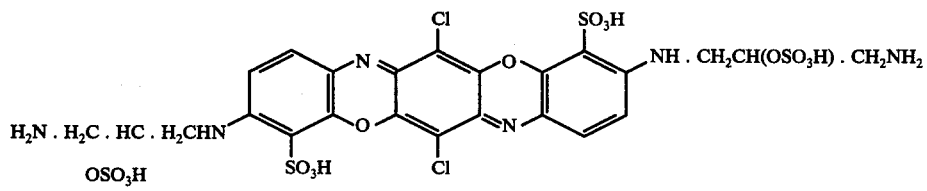

for the triphendioxazine used in Example 28. There is obtained a dyestuff which gives a reddish-blue shade when applied to cellulose by baking at 200° in the presence of cyanamide or dicyandiamide.

The dyebase (12) is prepared as described in Example 126 of UK Pat. No. 1,450,746.

Dyestuffs of similar shade are obtained if the 3-aminophenylphosphonic acid in Example 45 is replaced by equivalent amounts of the following:

| Example | Amine |
|---|---|
| 46 | 3-amino-4-sulphophenylphosphonic acid |
| 47 | 3-amino-4-methoxyphenylphosphonic acid |
| 48 | 4-aminophenylphosphonic acid |
| 49 | α-aminobenzylphosphonic acid |
| 50 | 2-chloro-4-sulpho-5-aminophenylphosphonic acid |
| 51 | 2,5-dimethyl-3-amino-4-sulphophenylphosphonic acid |
| 52 | 2-chloro-3-amino-4-sulpho-5-methylphenylphosphonic acid |
| 53 | 3-aminopropylphosphonic acid |
| 54 | 2-aminoethylphosphonic acid |

EXAMPLE 55

By following the procedure of Example 1 using an equivalent amount of a triphendioxazine a major component of which has the structure:

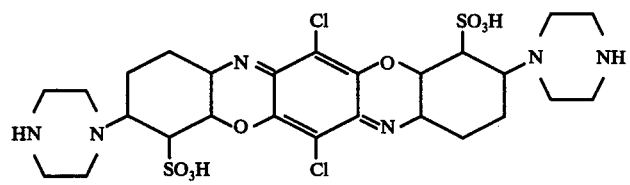

(Prepared as in Example 184 of UK 1,450,746).

in place of the triphendioxazine dyebase of Example 1. There is obtained a dyestuff which dyes cellulose bright blue shades when applied at 200° in the presence of cyanamide and dicyandiamide.

Dyestuffs of similar shade and fastness properties are obtained if the 3-aminophenylphosphonic acid of Example 55 is replaced by equivalent amounts of the following:

| Example | Amine |
|---|---|
| 56 | 3-aminopropylphosphonic acid |
| 57 | 3-amino-4-methoxyphenylphosphonic acid |
| 58 | 3-amino-4-sulphophenylphosphonic acid |

EXAMPLE 59

By following the procedure of Example 1 replacing the triphendioxazine dyebase used in Example 1 with an equivalent amount of a triphendioxazine a major component of which has the formula:

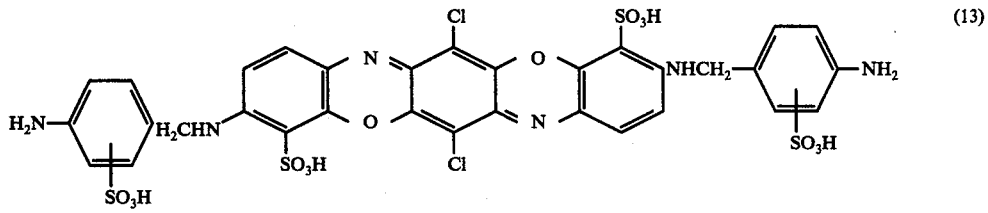

there is obtained a dyestuff which dyes cellulose in bright blue shades when applied at 200° in the presence of cyanamide or dicyandiamide.

The dyebase (13) is prepared as described in Example 183 of UK Pat. No. 1,450,746.

Dyestuffs of a similar shade and fastness are obtained when the 3-aminophenylphosphonic acid for Example 59 is replaced by equivalent amounts of the following:

| Example | Amine |
|---|---|
| 60 | 3-aminopropylphosphonic acid |
| 61 | 3-amino-4-methoxyphenylphosphonic acid |
| 62 | 3-amino-4-sulphophenylphosphonic acid |
| 63 | 4-aminophenylphosphonic acid |

EXAMPLE 64

By following the procedure of Example 1 replacing the triphendioxazine used in Example 1 by a triphendioxazine of structure:

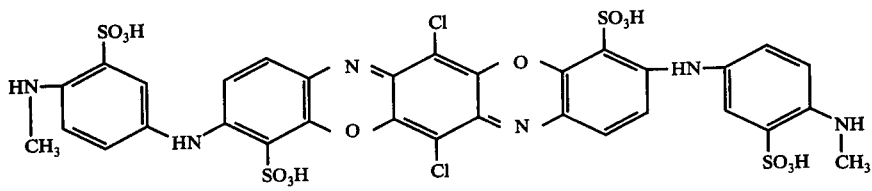

there is obtained a dyestuff which dyes cellulose in bright blue shades when applied at 200° in the presence of cyanamide or dicyandiamide.

Dyestuffs of similar shade and fatenesss are obtained if the 3-aminophenylphosphonic acid in Example 64 is replaced by an equivalent amount of the following:

| Example | Amine |
|---|---|
| 65 | 3-aminopropylphosphonic acid |
| 66 | 3-amino-4-methoxyphenylphosphonic acid |

EXAMPLE 67

By following the procedure of Example 1 replacing the triphendioxazine used in Example 1 by a triphendioxazine of the formula:

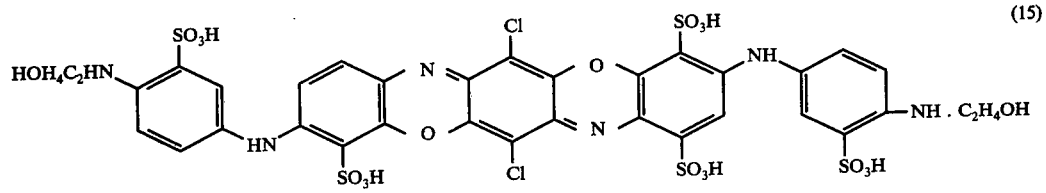

there is obtained a dyestuff which dyes cellulose in bright blue shades when applied at 200° in the presence of cyanamide or dicyandiamide.

Dyestuffs of similar shade and fastness are obtained when the 3-aminophenylphosphonic acid in Example 67 is replaced by equivalent amounts of the following:

| Example | Amine |
|---|---|
| 68 | 3-amino-4-methoxyphenylphosphonic acid |
| 69 | 4-aminophenylphosphonic acid |
| 70 | 3-amino-4-sulphophenylphosphonic acid |

EXAMPLE 71

By following the procedure of Example 1 replacing the triphendioxazine of Example 1 by an equivalent amount of a triphendioxazine a major component of which has the structure:

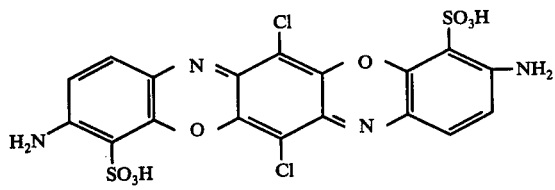

(prepared as in Example 1 to UK Pat. No. 1,349,513) there is obtained a product which dyes cellulose in very reddish-blue shades by baking at 200° in the presence of cyanamide and dicyandiamide.

EXAMPLE 72

A dyestuff of similar shade to that of Example 71 is obtained when the procedure of that Example is followed and the 3-aminophenylphosphonic acid is replaced by an equivalent amount of 3-amino-4-sulphophenylphosphonic acid.

EXAMPLE 73

1.74 Parts of 3-sulphoaniline are dissolved in 35 parts of water and adjusted to pH 7.0 with 8 parts of 2N aqueous ammonia, and the resulting solution added at room temperature to a solution of 5.5 parts of the dyestuff prepared as in Example 28 in 800 parts of water.

The mixture is heated to 80°-85° over 45 mm and maintained at 85°-90° for 3 hours, maintaining the pH at 7.5-8.0 with 2N aqueous ammonia. The mixture is drowned into 2500 parts of acetone, stirred for 30 min. and filtered. The product is washed with acetone and dried at 50°.

When applied to cellulose at 200°-210° in the presence of cyanamide or dicyandiamide, it yields bright blue shades with good fastness to light and washing.

Dyes of similar shades are obtained when the following triphendioxazine dyestuffs containing phosphonic acids are reacted with equivalent amounts of various amines given in the following table at similar temperature and pH conditions to those described in Example 73.

| Example | Dyestuff | Amine |
|---|---|---|
| 74 | Example 25 | 2-ammonaphthalene-1,5-disulphonic acid |
| 75 | " | sulphanilic acid |
| 76 | " | aniline |
| 77 | " | 3,5-disulphoaniline |
| 78 | Example 1 | 3-sulphoaniline |
| 79 | " | 4-sulphoaniline |
| 80 | " | 3,5-disulphoaniline |
| 81 | " | aniline |
| 82 | " | p-toluidine |
| 83 | " | 4-carboxyaniline |
| 84 | " | 3-carboxyaniline |
| 85 | " | ammonia |
| 86 | " | methylamine |
| 87 | " | ethylamine |
| 88 | " | n-butylamine |
| 89 | " | β-sulphoethylamine |
| 90 | Example 7 | p-chloroaniline |
| 91 | " | 2-methyl-5-sulphoaniline |
| 92 | " | N-sulphomethylaniline |
| 93 | " | N-methyl-3-sulphoaniline |
| 94 | Example 8 | morpholine |

-continued

| Example | Dyestuff | Amine |
|---|---|---|
| 95 | " | 2-amino-4,6,8-trisulphonaphthalene |
| 96 | " | dimethylamine |
| 97 | Example 68 | 2-amino-4,8-disulphonaphthalene |
| 98 | Example 1 | 2-amino-6,8-disulphonaphthalene |
| 99 | " | 2-amino-5,7-disulphonaphthalene |
| 100 | " | 4-sulphobenzylamine |
| 101 | " | N-methyl-taurine |
| 102 | " | N-methyl-β-alanine |
| 103 | " | di(n-butyl)amine |
| 104 | " | di(β-hydroxyethyl)amine |
| 105 | " | β-hydroxyethylamine |
| 106 | " | β-hydroxypropylamine |
| 107 | " | diethylamine |
| 108 | " | 2-amino-1-sulphonaphthalene |
| 109 | " | 4-amino-3,5-disulphoaniline |
| 110 | " | 2,3-dicarboxy aniline |
| 111 | " | 3,5-disulphoaniline |
| 112 | " | benzylamine |
| 113 | " | 4-aminodiphenylamine-2,3'-disulphonic acid |
| 114 | " | 4,4'-diaminodiphenylamine 2,3'-disulphonic acid |

EXAMPLE 115

1.6 Parts of 30 aminophenylphosphonic acid are dissolved in 25 parts of water and the solution neutralised with N-sodium hydroxide to pH 7.0. This solution is added to a solution of 11.4 parts of a reactive triphendioxazine dyestuff of the formula:

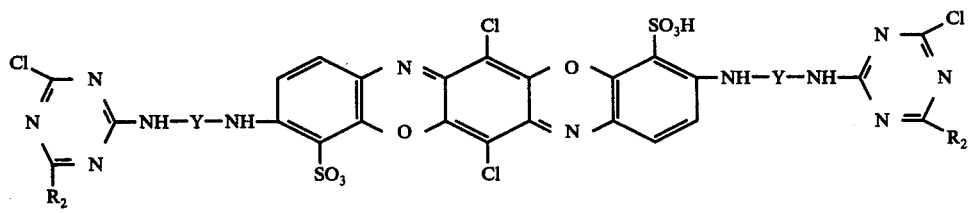

where Y is $C_2H_4$ and $R_2$ is 2,5-disulphoanilino (Example 6 of UK Pat. No. 1,450,746) in 300 parts of water. The mixture is heated at 75°–80° C at pH 6.5–7.0 for 4 hours and at 85°–90° C for 7.½ hours.

The product is isolated by dilution with acetone and filtration.

When applied to cellulose by baking at 200°–210° C in the presence of cyanamide and dicyandiamide it gives bright blue shades with very good fastness to light and washing.

Similar dyes are obtained if the dyestuff used in the above Example is replaced by an equivalent amount of a dyestuff in which Y and $R_2$ have the meanings given in columns II and III of the following Table and the 3-aminophenylphocphonic acid is replaced by an equivalent amount of the phosphonic acid given in column IV of the Table.

| I Example | II Y | III $R_2$ | IV Phosphonic acid |
|---|---|---|---|
| 116 | $C_2H_4$ | 3,5-disulphoanilino | 3-aminophenylphosphonic acid |
| 117 | " | 3,5-disulphoanilino | 3-amino-4-methoxyphenylphosphonic acid |
| 118 | " | 5,7-disulpho-2-naphthylamino | 3-aminophenylphosphonic acid |
| 119 | " | 6,8-disulpho-2-naphthylamino | " |
| 120 | " | 3,8-disulpho-1-naphthylamino | " |
| 121 | " | 2-carboxy-4-sulphoanilino | |
| 122 | " | 2-carboxy-4,5-disulphoanilino | |
| 123 | 2-sulpho-1,4-phenylene | 2-methyl-4,5-disulpho anilino | |
| 124 | " | 4-sulphoanilino | " |
| 125 | " | 2,5-disulphoanilino | " |
| 126 | " | 3,5-disulphoanilino | " |
| 127 | " | 5,8-disulpho-2-naphthylamino | " |
| 128 | " | 2-carboxy-4-sulphoanilino | " |
| 129 | " | 3-carboxyanilino | " |
| 130 | " | 3,4-dicarboxyanilino | " |
| 131 | " | β-sulphoethylamino | " |
| 132 | " | amino | " |
| 133 | " | amino | 3-amino-4-methoxyphenyl phosphonic acid |

EXAMPLE 134

A 10% solution of the dyestuff described in Example 1 is treated with 2 moles of nicotinic acid and the resulting mixture heated at 95° for 24 hours. The mixture is diluted with excess acetone and the product filtered off, washed with acetone and dried at 50°.

When applied to cellulose by baking at 200°–210° in the presence of cyanamide or dicyandiamide, the dyestuff gives bright blue shades with very good fastness to washing and light.

Dyes of similar shade and fastness are obtained when the nicotinic acid in Example 134 is replaced by the following tertiary amines.

| Example | Tertiary amine |
|---|---|
| 135 | isonicotinic acid |
| 136 | pyridine |
| 137 | γ-picoline |
| 138 | trimethylamine |

EXAMPLE 139

The procedure of Example 134 is repeated replacing the dyestuff of Example 1 by the dyestuff described in Example 28 to give a reddish-blue dye when applied to cellulose by baking at 200°-210° in the presence of cyanamide or dicyandiamide.

Further dyestuffs of similar properties are obtained when the procedure of Example 139 is repeated using the dyestuff produced in the Example given in column II of the following Table and the tertiary amine given in column III.

| I Example | II Dyestuff | III Tertiary amine |
|---|---|---|
| 140 | Example 33 | nicotinic acid |
| 141 | Example 34 | pyridine |
| 142 | " | trimethylamine |
| 143 | " | nicotinic acid |
| 144 | Example 10 | trimethylamine |
| 145 | Example 7 | nicotinic acid |
| 146 | " | isonicotinic acid |
| 147 | " | γ-picoline |
| 148 | " | pyridine |
| 149 | " | trimethylamine |
| 150 | Example 18 | nicotinic acid |
| 151 | " | isonicotinic acid |
| 152 | " | γ-picoline |
| 153 | " | pyridine |
| 154 | " | trimethylamine |
| 155 | " | dimethylethylamine |

EXAMPLE 156

An aqueous solution of the dye described in Example 138 is adjusted to pH 11 with sodium carbonate and the mixture stirred 24 hours at pH 11 at 20°-25° C. The mixture is diluted with acetone and the product collected, washed with acetone and dried at 50°. There is obtained a product believed to have a structure of formula (3),

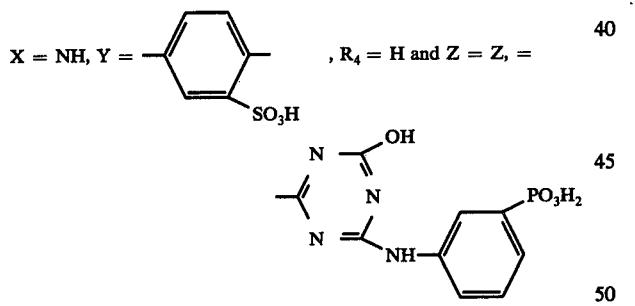

$X = NH, Y = $ , $R_4 = H$ and $Z = Z, =$

When applied to cellulose by baking at 200°-210° in the presence of cyanamide or dicyandiamide, bright blue shades with good fastness to light and washing are obtained.

EXAMPLE 157

The aminotriphendioxazine dyebase (10) used in Example 1 is reacted with 2,4-dichloro-6-methoxy-2-triazine, and the resulting reactive dye reacted at 85°-90° with 3-aminophenylphosphoric acid at pH 75-80, following the general procedure of Example 73 to give a dyestuff which gives bright blue shade when applied to cellulose by baking at 200°-210° in the presence of cyanamide and dicyandiamide.

Dyes of similar shade may be obtained if the 2,4-dichloro-6-methoxy-s-triazine in the above procedure is replaced by an equivalent amount of the following:

| Example | 158 | 2,4-dichloro-6-ethoxy-s-triazine |
|---|---|---|
| | 159 | 2,4-dichloro-6-n-butoxy-s-triazine |
| | 160 | 2,4-dichloro-6-phenoxy-s-triazine |
| | 161 | 2,4-dichloro-6-(4'-sulphophenoxy)-s-triazine |

EXAMPLE 162

The procedure of Example 1 is followed replacing the cyanuric chloride by cyanuric bromide to give a dyestuff of similar properties to that obtained in Example 1.

What we claim is:

1. A dyestuff having the formula:

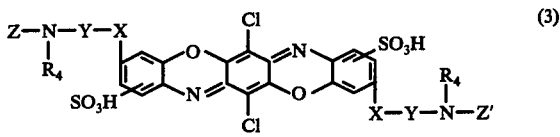

(3)

wherein

X is NH $R_4$ is selected from the group consisting of H, $C_{1-4}$ alkyl and $C_{1-4}$ alkyl substituted by one of OH, $SO_3H$ or COOH;

Y is selected from the group consisting of phenylene substituted by 0-2 $SO_3H$, or $-CH_2CH_2-$, or $-CH_2-CH(OH)-CH_2-$, or $-CH_2-CH_2-CH(OSO_3H)CH_2-$, or

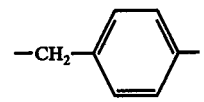

or X and Y together are a direct link; or the group $-X-Y-NR_4-$ is

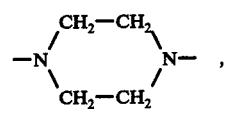

Z and Z' are each selected from the group consisting of H and

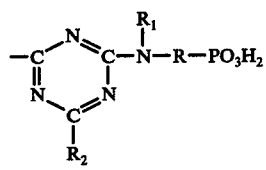

wherein $R_2$ is OH; Cl; Br; $NH_2$; $C_{1-4}$ alkylamino; di($C_{1-4}$alkyl)amino; $C_{1-4}$alkyl amino or di($C_{1-4}$alkyl) amino radicals of which one or both of the alkyl groups is substituted by OH, $SO_3H$, $OSO_3H$ or COOH; N-morpholino; benzylamino; sulphobenzylamino; phenoxy; sulphophenoxy; mono-, di- or tri-sulphonaphthylamino; dicarboxy anilino; or a radical of the formula:

wherein
q = 0, 1 or 2; R₅ is H, methyl, sulphomethyl, ethyl

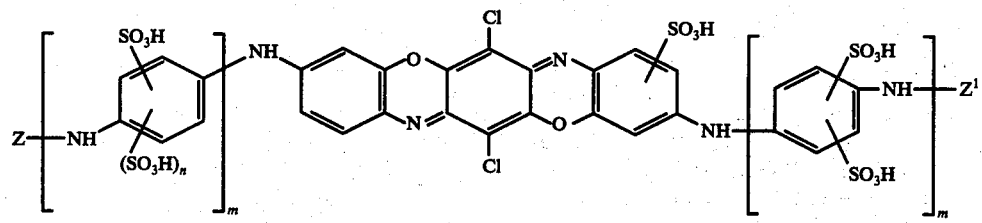

or hydroxyethyl; and R₆ is H, CH₃, OCH₃, COOH, Cl, NH₂ or

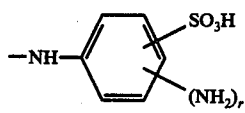

where
r = 0 or 1 or R₂ is a quaternary ammonium group selected from the group consisting of N⁺(CH₃)₃ hal⁻, N⁺(CH₃)₂ C₂H₅ hal⁻ and

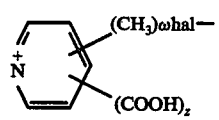

where
hal is Cl or Br, ω = 0 or 1 and z = 0 or 1;
R₁ is selected from the group consisting of H, C₁₋₄ alkyl and C₁₋₄ alkyl substituted by one of OH, SO₃H, or COOH, and
R is selected from the group consisting of C₁₋₆ alkylene, C₁₋₆ hydroxyalkylene, phenylene having 0–3 substituents each selected from the group consisting of SO₃H, C₁₋₄ alkyl, alkoxy and chloro; naphthylene, sulphonaphthylene, benzylidene and a group of the formula:

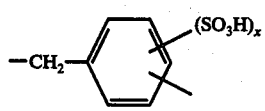

where
x = 0 or 1 providing that at least one of Z and Z¹ is not H.

2. A dyestuff as claimed in claim 1 wherein R₁ and R₄ are each selected from a group consisting of H, methyl, ethyl and hydroxyethyl.

3. A dyestuff as claimed in claim 1 having the formula:

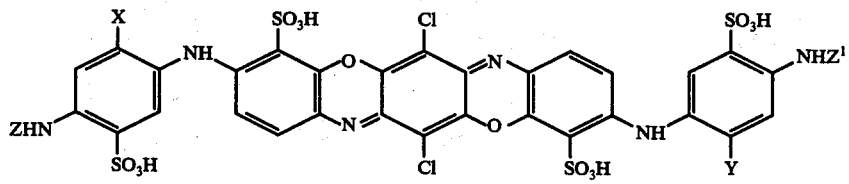

wherein m = 0 or 1, n = 0 or 1 and Z and Z¹ have the meanings given in claim 1.

4. A dyestuff as claimed in claim 1 having the formula:

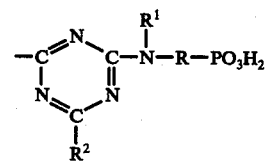

wherein X and Y are independently H or SO₃H and Z and Z¹ have the meanings given in claim 1.

5. A dyestuff as claimed in claim 1 wherein Y is a phenylene group substituted by 1 or 2 SO₃H; R⁴ is H; and both Z and Z¹ are the same and of the formula:

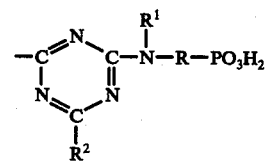

wherein
R is selected from the group consisting of 1,3-phenylene, CH₂CH₂, 4-sulpho-1,3-phenylene, 4-methoxy-1,3-phenylene, CH₂CH₂CH₂, 2,5-naphthylene, 4-methyl-1,3-phenylene, CH₂CH₂CH₂CH₂,

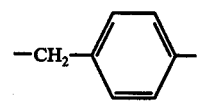

and 1,4-phenylene;
R¹ is H or methyl; and
R² is selected from a group consisting of Cl, OCH₃, 3-sulphoanilino, morpholino, NH₂ and Br.

6. A dyestuff as claimed in claim 1 of the formula:

Z¹ — Q¹ — Z wherein Q¹ is the 2,9-N,N' diradical of 2,9-di(4'-aminoanilino)-6,13-dichlorotriphendioxazine-3,3',3'',5',10-pentasulphonic acid or the corresponding 3,3',3'',5',5'',10-hexasulphonic acid and both Z and Z¹ are the same and of the formula:

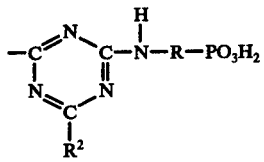

wherein
R is selected from the group consisting of 1,3-phenylene, $CH_2CH_2$, 4-sulpho-1,3-phenylene, 4-methoxy-1,3-phenylene, $CH_2CH_2CH_2$, 2,5-naphthylene and 4-methyl-1,3-phenylene; and
$R_2$ is selected from the group consisting of Cl, $OCH_3$ and 3-sulphoanilino.

7. A dyestuff as claimed in claim 1 of the formula:

$$Z^1 - Q^1 - Z$$

wherein $Q^1$ is the N,N'-diradical of 2,9-di(5'-aminoanilino)-6,13-dichlorotriphendioxazine-2',2'',3,4',10-pentasulphonic acid and 2',2'',3,4',4'',10-hexasulphonic acid and both Z and $Z^1$ are the same and of the formula:

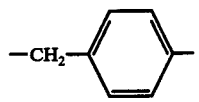

wherein
R is selected from the group consisting of 1,3-phenylene, 4-sulpho-1,3-phenylene, $CH_2CH_2CH_2CH_2$,

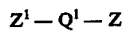

and 1,4-phenylene;
$R^1$ is H or $CH_3$; and
$R^2$ is selected from the group consisting of Cl, morpholino, 3-sulphoanilino, $OCH_3$, $NH_2$ and Br.

8. A dyestuff as claimed in claim 1 of the formula:

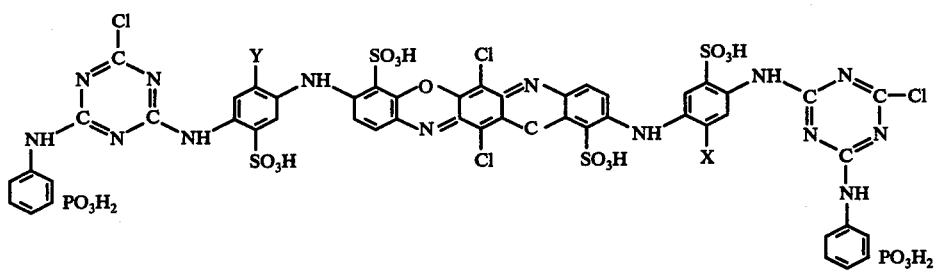

wherein each of X and Y may be H or $SO_3H$.

* * * * *